Oct. 30, 1928.
K. KOENIGSBERG
1,689,786
DIRECTION INDICATOR
Filed Aug. 25, 1927
2 Sheets-Sheet 1
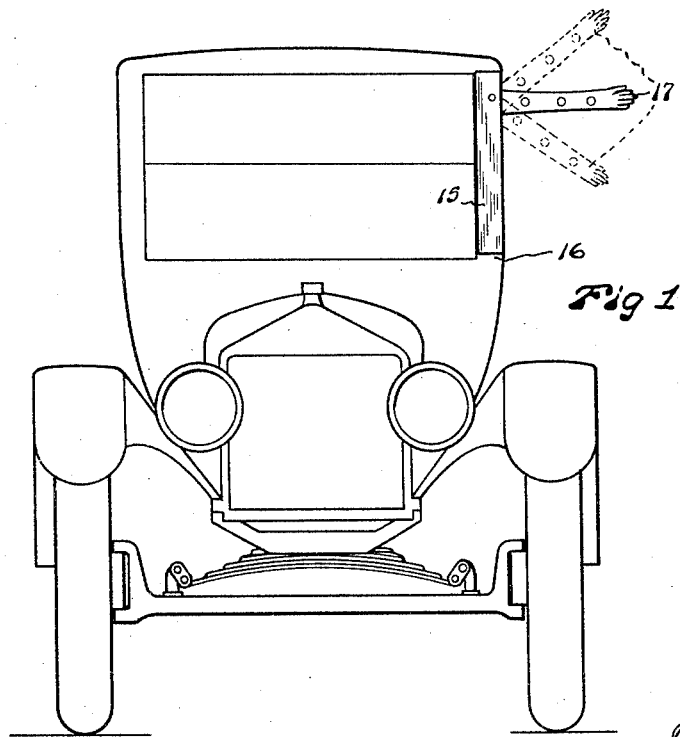
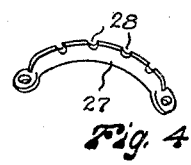
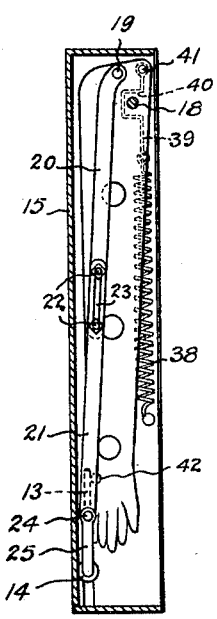
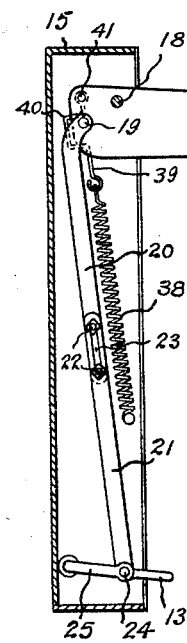
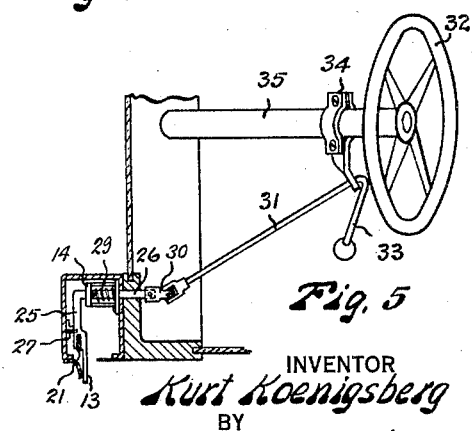
INVENTOR
Kurt Koenigsberg
BY
Fred C Matheny
ATTORNEY Oct. 30, 1928.  
K. KOENIGSBERG  
1,689,786  
DIRECTION INDICATOR  
Filed Aug. 25, 1927  2 Sheets-Sheet 2
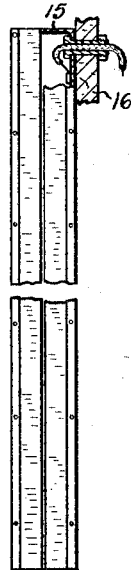
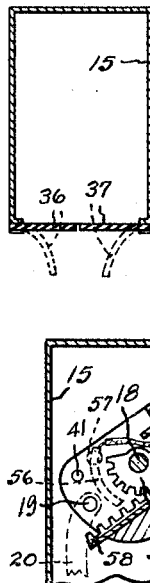
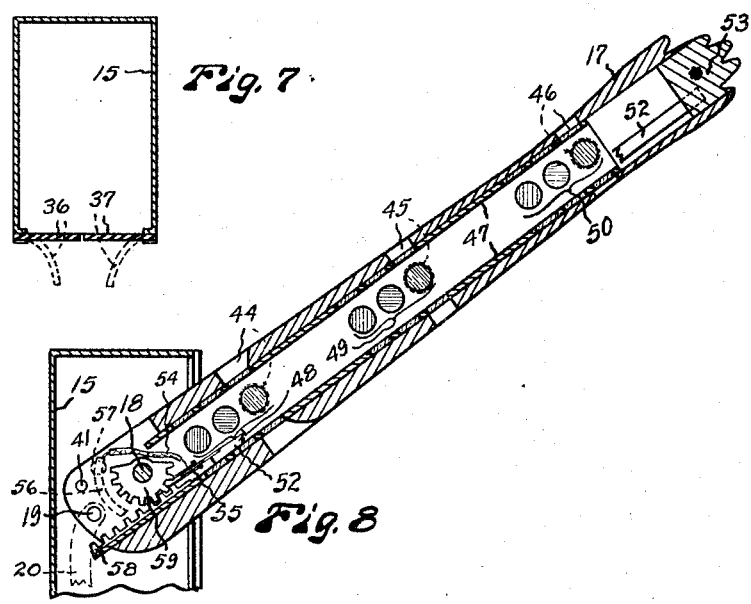
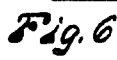
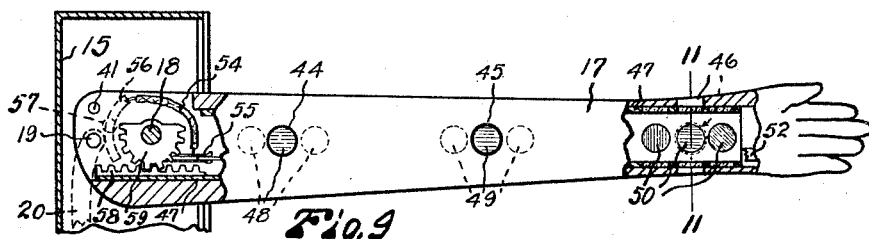
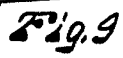
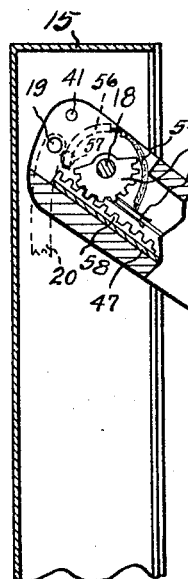
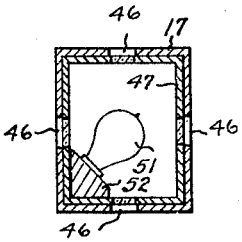
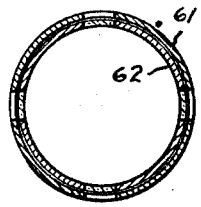
INVENTOR  
Kurt Koenigsberg  
BY  
Fred C. Matheny  
ATTORNEY Patented Oct. 30, 1928.

1,689,786

UNITED STATES PATENT OFFICE.

KURT KOENIGSBERG, OF SEATTLE, WASHINGTON.

DIRECTION INDICATOR.

Application filed August 25, 1927. Serial No. 215,304.

My invention relates to improvements in direction indicators for vehicles and is in the nature of an improvement on my prior Patents No. 1,506,004, issued Aug. 26, 1924, and No. 1,628,157, issued May 10, 1927.

The general object of my present invention is to improve the construction of manually operated direction indicators of this class and to render the same more readily adapted to vehicles of different type and more efficient and reliable in operation.

More specific objects are: to provide means for efficiently counterbalancing the weight of a pivotally mounted signal arm, said means tending to help lift said arm and further tending to hold said signal arm in an inoperative position when it is lowered and also serving to take up all play and prevent all rattling noise; to provide improved link mechanism enclosed within the signal housing for moving the signal arm into various signalling positions; to provide improved operating devices arranged in close proximity to the vehicle steering wheel for operating the signal arm; to provide kick out means for imparting an initial starting movement to the signal arm; and to provide efficient means for excluding the weather from the signal arm housing at all times and for improving the appearance of the signal.

Another object is to provide novel and efficient means for producing illuminations of different colors within a signal arm without employing a different source of light for each color.

Other and more specific objects will be apparent from the following description, taken in connection with the accompanying drawings.

In the drawings Figure 1, is a view in front elevation showing a typical installation of my invention.

Figs. 2 and 3 are sectional views, with parts shown in elevation, illustrating two positions of my signal device.

Fig 4 is a detached perspective view of a detent member used in connection with the invention.

Fig. 5 is a view partly in cross section of the signal housing, showing in plan, the signal arm operating mechanism in its relation to the vehicle steering wheel.

Fig. 6 is a detached edge view of the signal housing showing the means for excluding the weather from the edge through which the signal arm operates.

Fig. 7 is a cross section on a larger scale of the signal housing.

Figs. 8, 9 and 10 are fragmentary views partly in section and partly in elevation illustrating three different positions of the illuminated signal arm embodied in my invention.

Fig. 11 is an enlarged cross sectional view of the signal arm.

Fig. 12 is a cross sectional view of a modified form of signal arm.

Like reference numerals designate like parts throughout the several views.

Referring to Figs. 1 to 11 inclusive, I show a direction indicator embodying a relatively long, rectangular, box like housing 15 arranged to be secured to the post 16 at the side of the windshield of a motor vehicle as shown in Figs. 1 and 5. A signal arm 17 is mounted for oscillation on a pivot 18 that extends crosswise of the housing 15 near the upper end and near the front edge thereof. The signal arm is preferably in the form of a human arm and hand so as to simulate the form of signal that the public is most accustomed to. The rear end of the signal arm 17 extends beyond the fulcrum 18 and is connected by a pivot 19 with the upper end of a two part operating link which is composed of an upper section 20 and a lower section 21 adjustable lengthwise of each other by means of bolts 22 that pass through slots 23 in the links 20 and 21. The lower end of the link section 21 is connected by a pivot 24 with the end of a crank 25 on a short shaft 26 that is journaled in a bearing 14 in the housing 15 and extends rearwardly through the windshield member 16 to which the housing 15 is secured. A kick out member 13 is rigid with the crank 25 or shaft 26 and arranged to engage preferably with a lug 42 on the arm 17 to impart the initial starting movement to the arm 17 in the act of raising the same as hereinafter described. The crank arm 25 is movable over a detent sector 27 Fig. 4, that preferably has four notches, 28 provided therein at spaced intervals, as shown, in which the crank arm may rest when the signal arm is in the inoperative position or in any one of its three signaling positions. A spring 29 yieldingly urges the crank arm 25 against the sector 27 and the shaft 26 is allowed sufficient endwise play to permit the crank arm 25 to move into and out of the notches 28.

When the signal arm 17 is within the housing 15 the crank arm 25 will preferably be substantially vertical and the center of the pivot 24 will be to the rear of a straight line passing through pivot 19 and shaft 25 thus locking the signal arm in the housing and provided the necessary lost motion to insure efficient operation of the kick out device.

The shaft 26 is connected by a universal joint 30 with an operating rod, 31 that extends rearwardly at an angle, as shown in Fig. 5, to a point just below the steering wheel 32 of the vehicle and is provided with a downturned crank handle 33 by which the operating rod may be turned to move the signal arm to and from the various signaling positions. A bracket 34 arranged to be clamped to the steering post housing 35 forms a bearing and support for the operating rod 31.

The signal arm 17 is adapted to be moved from a position within the housing, Fig. 2 to various signaling positions outside of said housing, the arm necessarily swinging in and out through one edge of the housing. To prevent the admission of moisture in the form of rain, snow and the like into the housing and to further add to the general appearance of the housing I provide on the open side of said housing two flaps 36 and 37, Figs. 6 and 7 that serve as a flexible closure for the otherwise open edge of the housing and that yield freely to permit the arm 17 to swing into and out of the housing.

An important feature in the invention resides in the means for counterbalancing the weight of the signal arm so that said signal arm may be operated easily by the relatively short crank handle 33. The signal arm is necessarily long to be plainly visible from the front and rear and is pivoted at one end. The distance between the two pivots 18 and 19 is short and the crank handle 33 is necessarily short as it must be disposed within the motor vehicle without being in the way. This system of levers places the operator of the signal at a considerable disadvantage and makes it very desirable to provide a counterbalancing means to help lift the weight of the signal arm. In connection with the counterbalancing means it is also desirable that the line of application of the counterbalancing force should be shifted from one side to the other of the pivot of the signal arm when said signal arm is folded within the housing so that the counterbalancing means will tend to hold the signal within the housing. I accomplish these objects by providing a helical counterbalancing tension spring 38, secured at its lower end to the housing near the front edge and at its upper end to a rod 39 that is bent at 40 to form an arch portion and that is secured by a pivot 41 to the upper end of the signal arm 17. The arched portion 40 serves to clear the pivot 18 and permits the line of pull of the spring 38 to pass to the front of the pivot 18 when the signal arm is folded or withdrawn into the inoperative position shown in Fig. 2, in which position the spring will tend to hold the signal arm within the housing. The kick out member 14 applies an initial impulse directly to the lower end of the signal arm thus starting the arm out of the housing with ease to the operator. It is noted that the kick out means operates at the time when the line of pull between the centers of pivots 19 and 24 is closest to the center of pivot 17.

I have specifically described one form of counterbalancing apparatus for accomplishing the automatic change of direction in the balancing force, the same tending to urge the arm into the housing when it is lowered and to raise the arm after it has been moved outwardly a predetermined amount but I also contemplate the use of other counterbalancing means, for instance, the upper or short end of said arm may be provided with means carrying a weight, as a ball or cylinder, which may roll thus shifting its weight from one side to the other of the signal arm pivot, or a liquid may be used in a similar manner.

Ordinarily, when no signal is being given, the signal arm 17 will be withdrawn into the housing 15 as shown in Fig. 2. When a signal is to be given to indicate a right or a left turn or "stop" the driver grasps the crank arm 33 and turns it in the direction that is calculated to move the crank 25 and kick out member 13 clockwise, as shown in Figs. 2 and 3, at the same time exerting a slight pull on the rod 31. The pull helps to withdraw the lever 25 from the notch 28 in which it rests. The turning movement first causes the kick out 13 to throw the bottom end of the signal arm outwardly after which the links 20—21 will swing the signal arm 17 outwardly and upwardly. If a "stop" signal is to be given the crank is allowed to come to rest in the second notch 28 below the top of bracket 27 leaving the arm pointed downward and outward at an angle of approximately forty five degrees from the housing. If a "left turn" signal is to be given, the signal arm is raised into a substantially horizontal position, while if a right turn signal is to be given the signal arm is moved on past the horizontal so that it points outward and upward, all as shown by broken and full lines in Fig. 1, these signals being conventional and generally understood by the public. If desired the uppermost notch 28 may be omitted to facilitate ease in starting the outward swinging move ment of the signal arm. The kick out member 13 is important in facilitating ease of starting the upward movement of the signal arm, it being apparent that this pressure applied directly to the lower end of said signal arm will move it very easily against the tension of the spring 38 and that after the movement of said arm is once started and the line of pull of the spring 38 has crossed or passed to the rear of the pivot 18 the combined force of said spring 38 and the pull exerted on the links 20—21 will easily raise said arm into a signaling position. Without the kick out member it requires considerable torque exerted on the crank arm 33 to start the movement of the signal arm.

To give greater visibility at night the interior of the signal arm is preferably illuminated and provision is made for changing the color of the illumination for different positions of the signal arm, for instance a stop signal may be red or orange, a left turn signal may be blue and a right turn signal may be green. To accomplished this I preferably provide on all four sides of the signal arm three sight openings 44, 45, and 46. If desired, these sight openings may have clear glass placed thereover to exclude the weather. The signal arm is made hollow to receive a reciprocable slide 47 and the slide is provided preferably in each of its four sides with three sets of colored sections 48, 49 and 50 arranged to cooperate with the respective sight openings 44, 45 and 46 to display different colored lights therethrough depending on the position of the slide within the signal arm. Each color section 48, 49 and 50 preferably comprises three openings or holes in the slide 47 arranged in close proximity to each other and covered or set with colored lenses, for instance, the hole nearest the signal housing in each color set may be covered with red, the middle hole may be covered with blue and the outer end hole may be covered with green. These colors are shown by the conventional shading on some of the drawings. Electric lamp bulbs 51 may be supported within the slide 47 directly opposite each sight opening 44, 45 and 46 in the signal arm. These bulbs are preferably mounted on a relatively movable support 52 that is secured at its outer end to a removable block 53 which forms a part of the tip or hand of the signal arm. The block 53 and support 52 are removable through the outer end of the signal arm for the purpose of replacing burned out lamp bulbs. Circuit wire 54 supplies current to the lamp bulb and sliding switch 55 near the pivot of the signal arm permits the removal of slide 52. I prefer to mount the lamps on a fixed support that may be removed but, if desired, the lamp may be mounted directly within the slide and be movable therewith.

An arcuate contact member 56 in the signal arm engaged by a contactor 57 on the signal housing makes it possible to close the electric circuit when the signal arm is raised and break said electric circuit when the signal arm is lowered or inoperative. The several contacts and terminals 55, 56 and 57 are necessarily insulated from the housing and, together with the circuit wires form one side of a circuit, the other side of the circuit being grounded in the usual manner.

The slide 47 is adapted to be moved lengthwise within the signal arm 17 by a rack 58 which is secured to the slide 47 and meshes with a gear segment 59 that is rigidly and non-rotatably supported on the pivot 18 about which the signal arm 17 swings.

In the operation of the illuminating means, when the signal arm is vertical the colored sections may all be out of registration with their respective sight openings. As the signal arm is moved upwardly to the "stop" signaling position Fig. 10, the first or red section of each color set is automatically moved opposite to its respective sight opening 44, 45 or 46. Further movement of the arms 17 to the "left turn" position shown in Fig. 9 moves the middle or blue section of each color set opposite its respective sight opening, while still further movement to the position shown in Fig. 8, moves the green or outer end section of each color set opposite its respective sight opening. In this way I am able to eliminate the necessity for providing a multiplicity of different colored lamps in order to obtain the desired color signals, it being apparent that, with my apparatus I can use any illuminating means that will flood the interior of the signal arm with light.

The colored lights are preferably displayed on the top edge and bottom edge of the signal arm for the benefit of persons to the sides of said signal arm and said lights are visible when said signal arm is inclined downward to signal a stop or is inclined upwardly to signal a right turn. Obviously the color lights in the top and bottom may be dispensed with and only the color lights in the front and rear of the signal arm used if desired.

Fig. 12 shows a four direction signal similar to Fig. 11, except that the signal arm or housing 61 and the slide 62 are circular in cross section instead of being square.

Obviously changes in the form, dimensions and general arrangement of parts of my signal may be resorted to within the scope and spirit of the following claims.

I claim:

1. A direction indicator, embodying a housing open at one edge, a signal arm pivoted at its upper end within said housing for swinging movement into and out of the housing, a counterbalancing rod connected with the upper end of the signal arm and curved to clear said signal arm pivot, a tension spring connected with the lower end of said rod and secured within said housing below said signal arm pivot whereby the spring will tend to hold the signal arm in an elevated position and the line of pull of the spring will cross the center of said signal arm pivot and tend to urge the signal arm into the housing when said signal arm is lowered and means for raising and lowering said signal arm.

2. In a direction indicator, a housing, a signal arm having its upper end pivoted within the upper end of said housing, a manually operated crank arm within the lower end of said housing, links connecting said crank arm with a point on the signal arm above the pivot of the same and kick out means connected with the crank arm and arranged to engage directly with the lower end of the signal arm for imparting an initial starting movement to the signal arm.

3. In a directing indicator, a housing, a signal arm having its upper end pivoted within the upper end of said housing, a manually operated crank arm within the lower end of said housing, links of adjustable length connecting said crank arm with a point on the signal arm above the pivot of the same, the connection between said link and said crank arm affording limited play, kick out means connected with the crank arm arranged to engage directly with the lower end of the signal arm for imparting an initial starting movement to the signal arm and manually operated means for moving said crank arm.

4. A direction indicator for use on a motor vehicle having the usual steering wheel which is set inwardly from the edge of a windshield, embodying a housing arranged to be secured to the edge of said windshield, a single arm mounted for swinging movement into and out of the housing, signal arm operating means including a crank within the housing, a notched detent member over which said crank is movable, a spring urging the crank against the detent, a shaft secured to the crank and extending rearwardly through the housing into the vehicle, an operating rod arranged in an inclined position and extending from said shaft to a point near the lower side of the operating wheel of the vehicle, bracket means forming a bearing for the inner end of the operating rod, a downturned hand lever on the inner end of the steering rod and universal joint means conecting the other end of the steering rod with said shaft.

5. In a direction indicator, a housing, a signal arm having its upper end pivoted near the upper end of said housing, a shaft extending into the housing and having a crank positioned within the housing, links connecting the crank with the signal arm for operating the signal arm, a notched detent member over which said crank is adapted to be moved, a spring urging said signal arm against said detent member and means external to the housing for turning said shaft, said shaft having a limited endwise movement to permit said crank to be withdrawn from said detent member against the force of said spring.

6. In a direction indicator, a housing, a signal arm having its upper end pivoted within the upper end of said housing, counterbalancing means for the signal arm, a link member pivotally connected with the upper end of said signal arm and extending downwardly within said housing, another link member adjustably connected with said first named link member, a shaft extending into the bottom end of said signal housing, a crank arm on said shaft having a slot and pin connection with the lowermost end of said last named link, a kick out member connected with said shaft for imparting an initial movement directly to the lower end of said signal arm, a notched detent engaged by said crank arm, an operating rod, a universal joint connecting said shaft and said operating rod, a crank handle on the inner end of said operating rod and bracket means for pivotally supporting the inner end of said operating rod in close proximity to a motor vehicle steering column.

7. A direction indicator, embodying a housing open at one edge, a signal arm pivoted within said housing for swinging movement into and out of the housing, the pivot for said signal arm being located near the open edge and near the upper end of said housing, a counterbalancing rod connected with the upper end of the signal arm and curved to clear said signal arm pivot, a tension spring connected with the lower end of said rod and secured within said housing below said signal arm pivot whereby the spring will tend to hold the signal arm in an elevated position and the line of pull of the spring will cross center of said signal arm pivot and tend to urge the signal arm into the housing when said signal arm is lowered, a link member pivotally connected with the upper end of said signal arm and extending downwardly within said housing another link member adjustably connected with said first named link member, a shaft extending into the bottom end of said signal housing, a crank arm on said shaft having connection with the lowermost end of said last named link, a kick out member connected with said shaft for imparting an initial movement directly to the lower end of said signal arm, a notched detent engaged by said crank arm, an operating rod, a universal point connecting said shaft and said operating rod, a crank handle on the inner end of said operating rod and bracket means for pivotally supporting the inner end of said operating rod in close proximity to a motor vehicle steering column.

The foregoing specification signed at Seattle, Wash., this 11th day of August, 1927.

KURT KOENIGSBERG.